(12) United States Patent
Faenger et al.

(10) Patent No.: US 9,311,309 B2
(45) Date of Patent: Apr. 12, 2016

(54) ENTERTAINMENT MEDIA VISUALIZATION AND INTERACTION METHOD

(75) Inventors: Jens Faenger, Santa Clara, CA (US); Zhongnan Shen, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 1712 days.

(21) Appl. No.: 12/536,220

(22) Filed: Aug. 5, 2009

(65) Prior Publication Data

US 2011/0035705 A1 Feb. 10, 2011

(51) Int. Cl.
*G06F 3/00* (2006.01)
*G06F 17/30* (2006.01)
*G06F 3/01* (2006.01)

(52) U.S. Cl.
CPC .... *G06F 17/30053* (2013.01); *G06F 17/30058* (2013.01); *G06F 17/30743* (2013.01); *G06F 17/30749* (2013.01); *G06F 17/30761* (2013.01); *G06F 17/30772* (2013.01); *G06F 17/30775* (2013.01)

(58) Field of Classification Search
USPC ......................................... 715/716, 863, 821
See application file for complete search history.

(56) References Cited

U.S. PATENT DOCUMENTS

| 5,969,583 | A | 10/1999 | Hutchinson |
| 7,205,471 | B2 * | 4/2007 | Looney et al. ................. 84/615 |
| 2001/0030667 | A1 | 10/2001 | Kelts |
| 2003/0159150 | A1 | 8/2003 | Chernock |
| 2004/0260682 | A1 * | 12/2004 | Herley et al. ..................... 707/3 |
| 2007/0233726 | A1 | 10/2007 | Torrens |
| 2007/0244903 | A1 * | 10/2007 | Ratliff et al. .................... 707/10 |
| 2008/0086687 | A1 * | 4/2008 | Sakai et al. .................... 715/716 |
| 2008/0122796 | A1 * | 5/2008 | Jobs et al. ...................... 345/173 |
| 2009/0094663 | A1 * | 4/2009 | Ben-Yaacov et al. ......... 725/141 |
| 2009/0150697 | A1 * | 6/2009 | Yang ............................. 713/323 |
| 2010/0159909 | A1 * | 6/2010 | Stifelman ..................... 455/418 |

FOREIGN PATENT DOCUMENTS

| WO | 2007/000741 A2 | 1/2007 |
| WO | 2007/044389 A2 | 4/2007 |

OTHER PUBLICATIONS

Bergstra, et al., University of Montreal, CA, USA; "Aggregate Features and Adaboost for Music Classification"; 2006 Kluwer Academic Publishers, printed in the Netherlands; 16 pages.
West and Lamere; "Research Article: A Model-Based Approach to Constructing Music Similarity Functions"; Hindawi Publishing Corporation, EURASIP Journal on Advances in Signal Processing, vol. 2007, Article ID 24602, 10 pages.

(Continued)

*Primary Examiner* — Toan Vu
(74) *Attorney, Agent, or Firm* — Maginot Moore & Beck LLP

(57) ABSTRACT

A method of operating an entertainment system includes computer-implemented steps including accessing a source of audio/video content. The source is capable of providing a plurality of media items. The media items are analyzed to thereby determine a corresponding classification for each of the items. A visual representation of each of the classifications is provided on a display of the entertainment system. One of the classifications being selected by a user is sensed. In response to the sensing, one of the media items corresponding to the selected classification is played, and/or the user is offered a choice among a plurality of the media items corresponding to the selected classification.

1 Claim, 13 Drawing Sheets

(56) References Cited

OTHER PUBLICATIONS

Van Gulik, Rob and Vignoli, Fabio; "Visual Playlist Generation on the Artist Map"; Proceedings of the ISMIR International Conference on Music Information Retrieval; 2005 (4 pages).

Neumayer, Robert, Dittenback, Michael and Rauber, Andreas; "Playsom and Pocketsomplayer, Alternative Interfaces to Large Music Collations"; Proceedings Annual International symposium on Music Information Retrieval; Sep. 11, 2005 (6 pages).

Bergstra et al., Aggregate Features and Adaboost for Music Classification; 2006 Kluwer Academic Publishers, accepted for publication 2007 in Machine Learning; 16 pages.

\* cited by examiner

ENTERTAINMENT MEDIA VISUALIZATION AND INTERACTION METHOD

BACKGROUND OF THE INVENTION

1. Field of the Invention

The present invention relates to entertainment systems, and, more particularly, to entertainment systems that are operated in environments in which a user's attention is diverted to another primary task.

2. Description of the Related Art

Entertainment systems are known to include radios as well as playback devices such as compact disc (CD) players. Listening to music on the radio is a typical example of how using an entertainment system is highly dependent on personal preferences. People prefer to listen to radio stations that play the music they like. Similarly, they tune to stations that broadcast the news they are interested in. Tuning to a station can be seen as a very simple approach to personalizing a radio. A more advanced type of personalization would be to configure the station preset pushbuttons of a radio with a user's most favorite stations.

If more radio stations become available, the task of presetting or tuning to stations becomes increasingly complex. Nowadays, in addition to regular AM/FM stations, there are a great number of stations available on satellite radio, digital broadcast radio, and on the internet as IP radio streams. Finding the stations with interesting content demands more time and attention from the user since it is still a manual task that requires active input from the user.

A few attempts have been made to make it easier for the user to find music that he likes. Approaches such as www.Last.FM and Amazon.com use collaborative filtering technology that compares the relationship between different items such as songs based on user behavior. For example, persons that like to listen to artists such as Coldplay often also like to listen to similar pop music artists such as U2.

State of the art entertainment systems use different approaches for selecting content. Radios provide functions to find stations on different radio frequency bands. The user can use a seek function to find all the available radio stations in the area to decide which he is interested in. Some radios equipped with RDS (radio data system) offer a function that seeks for the next station that broadcasts a specific program type (PTY). This requires radio stations to transmit the correct RDS information.

Selection of music in CDs or CD changers is done by first selecting the CD, then manually selecting the track. The track is identified by either a number or a name if the CD contains the names of the songs by using the CD Text feature.

State of the art media players such as Apple's IPOD or Philips' STREAMIUM often use one of the following approaches for selection of music, podcasts and other audio content in, for example, mp3 format or movies in digital files: selection of options that are provided in a list; "random" playback; or "recommended" playback. The selection in lists is a common approach to allow the user to navigate through the content until the desired item is found. Many variations to this approach exist, such as displaying images representing the content (cover art, thumbnails), or using lists that are sorted by a variety of criteria (e.g., alphabetically, frequency of use, user interest). If the media collection is too large to allow for quick selection from a single list, a typical approach is to use a hierarchy of selection criteria. For example, in order to find a song from a particular artist, the user first selects the music genre, then the artist, the album, and finally the song. Thus, a range of decisions is required by the user in order to specify what media content he is interested in. In contrast, "random" playback requires no input from the user at all but the user leaves the selection of media content entirely to the media player. To mitigate this effect, "recommended" playback is becoming more popular. This playback technology still chooses the music automatically but takes into account the interest of the user in order to maximize playback of items the user prefers. A range of portable audio and video players make use of such recommendation technologies in order to offer personalized content to the user.

Both approaches, "random" and "recommended" playback, do not give the user direct influence on the items that will be selected next. If the user wants to be more specific or wishes to create a sequence of items, i.e., a playlist, he will have to use a list based approach again to specify in more or less detail what he would like.

Unless the user wants to leave all the control of selecting media items to an automated system, there must be some way for the user to express his interest. Expressing interest by using lists or its many variations involves a lot of decision making by the user. For example, the user has to decide what music category he is interested in. Then he has to specify the artists he is interested in. This works well as long as the user has a specific idea of what he is interested in. However, it does not work well if the user cannot decide on a specific category or does not know what categories an item belongs to. For example, the separation between the music genres "Rock" and "Pop" is not clearly defined and often depends on subjective criteria. So, if the user is interested in music that is somewhat in-between "Rock" and "Pop", this wish cannot be expressed in currently available media players which require the user to choose either "Rock" or "Pop". Decisions like this will have to be made in every step of the hierarchy until the user has found what he is interested in. This decision making process might be costly in environments where the user cannot spend a lot of attention and time on the media player or is not willing to. An example is entertainment systems in a vehicle. Because the user needs to focus on the driving task, the selection of media items needs to be done as quickly and with as few interaction steps as possible.

A media map is a graphical representation of media content available to a media player. This content can be stored on the media player itself or acquired from external storage devices such as flash memory cards or web services. In addition, content can be used from sources such as broadcast or streaming, for example, from radio stations.

In one known approach to creating a media map, music characteristics are extracted from audio content using Rhythm Histograms and Statistical Spectrum Descriptors. The resulting feature vectors are converted into a two-dimensional graphical representation using a Self Organizing Map. A property of the resulting map is that it preserves the topological properties of the input space. The resulting map reflects the input, but the creation process does not provide direct control over the visual appearance. For this reason, the Self Organizing Map might not display the music genres in a structured manner.

What is neither disclosed nor suggested in the art is a personalized entertainment system that overcomes the problems and limitations described above. More particularly, what is neither disclosed nor suggested is an entertainment system that graphically and spatially indicates to the user the available content, and that enables the user to select content via spatial hand gestures such as points, lines, and closed loops.

SUMMARY OF THE INVENTION

The present invention may provide a novel method for visualizing and browsing through a collection of entertainment media items such as music tracks, news, podcasts, movies, CDs and other audio and video content. In addition, the invention may enable browsing through radio and TV station content from AM/FM, digital radio and TV, satellite radio, internet radio and other streaming media sources of audio/video content. The invention may enable a user to quickly select content of interest, which makes it especially useful in environments where the user has limited time for interaction with the system, such as when the user is driving a vehicle. By incorporating gesture recognition, the invention may enable the user to easily select individual items, groups of items and playlists, i.e., sequences of items. Further, the invention may use dynamic visual representation techniques to display currently playing content, thereby effectively giving the user an overview of available content from different sources.

The invention comprises, in one form thereof, a method of operating an entertainment system in computer-implemented steps including accessing a source of audio/video content. The source is capable of providing a plurality of media items. The media items are analyzed to thereby determine a corresponding classification for each of the items. A visual representation of each of the classifications is provided on a display of the entertainment system. One of the classifications being selected by a user is sensed. In response to the sensing, one of the media items corresponding to the selected classification is played, and/or the user is offered a choice among a plurality of the media items corresponding to the selected classification.

The invention comprises, in another form thereof, a method of operating an entertainment system in computer-implemented steps including accessing a source of audio/video content. The source is capable of providing a plurality of media items. A corresponding classification for each of the items is determined. A respective representation for each of the classifications is provided on a display of the entertainment system. A plurality of the classifications being selected by a user in a sequential order is sensed. In response to the sensing, media items having the selected classifications are played in an order of their classifications in the sequential order.

The invention comprises, in yet another form thereof, a method of operating an entertainment system in computer-implemented steps including providing a visual representation of each of a plurality of categories of audio/video content on a display of the entertainment system. A user selecting an area in-between two of the representations on the display is sensed. The two representations correspond to a first of the categories and a second of the categories, respectively. In response to the sensing, a media item having characteristics of each of the first and second categories of audio/video content is played, and/or the user is offered a choice among a plurality of media items. Each of the media items has characteristics of each of the first and second categories of audio/video content.

An advantage of the present invention is that the entertainment system may support the quick selection of media items.

Another advantage is that, unlike the known automated approaches "random" playback and "recommended" playback, the invention gives the user more control over what media item is chosen by providing a "media map" and technology to interact with it.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
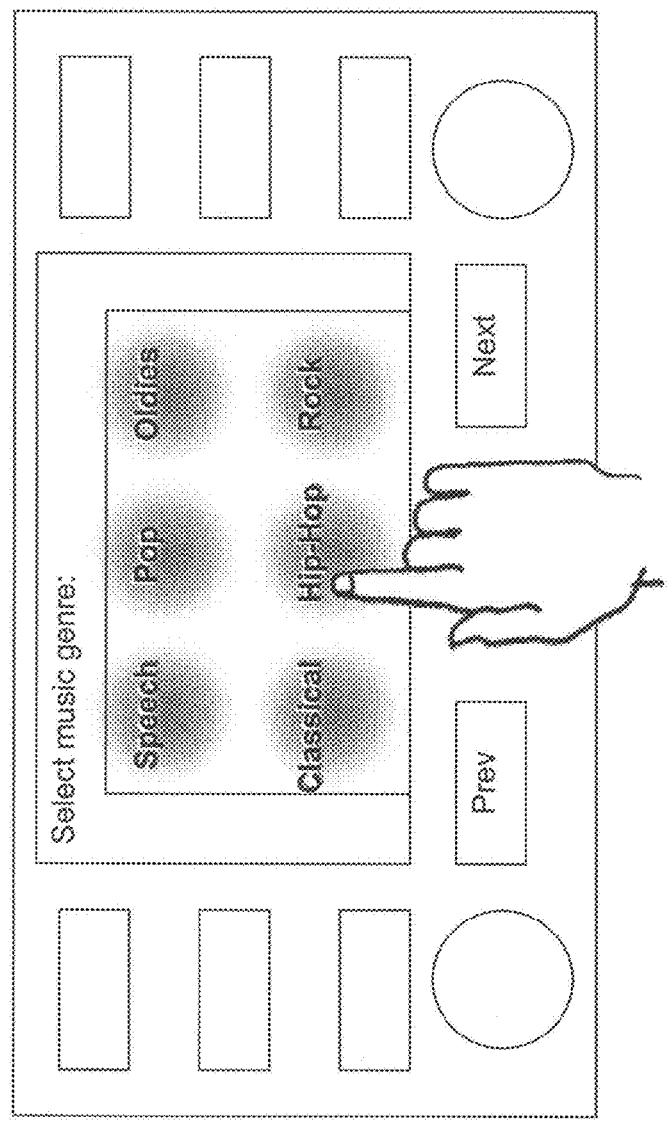
FIG. 1 is a diagram of one embodiment of a user interface of an entertainment system that may be used in conjunction with the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

The present invention may provide a method to enable a user of an entertainment system to make a quick selection of media content. Enabling such quick selection, a more structured, and thus more predictable, representation of the media content may be provided. In one embodiment, the invention uses a regular grid approach. In order to create the media map, a set of media characteristics may be determined and displayed in a two-dimensional matrix. Then the media content may be classified with regard to those characteristics. For example, audio content can be classified into different genres by using approaches such as disclosed in "Aggregate features and AdaBoost for music classification", Bergstra, J., Casagrande, N., Erhan, D., Eck, D. and Kegl, B., Machine Learning, Vol. 65, No. 2-3, pp. 473-484, 2006, which is hereby incorporated by reference herein in its entirety. Alternatively, instead of extracting characteristics from the content itself, meta-information attached to the media items can be used. The characteristics for each media item may be transformed to match a regular two-dimensional grid structure. As used herein, "media items" may include discrete selectable choices available to the user, such as radio stations, CDs, songs, or audio books, for example. The grid may include hotspots, which may be areas that identify categories of the media with a high level of confidence. For example, hot spots can represent different music genres as illustrated in FIG. 1, wherein the hotspots are indicated by the darkened areas labeled "Speech", "Pop", "Oldies", "Classical", "Hip-Hop", and "Rock".

The closer a media item lies to the middle of a hot spot, the greater may be its similarity to the music category represented by the hot spot. Further, media items that fall somewhere between two hotspots partially belong to both categories represented by the hotspots and may have characteristics of each hotspot. The graphical representation may convey this transition between categories by "blending" hotspots into each other.

In FIG. 1, the hotspots may be arranged in a matrix of two rows and three columns in order to best be accommodated by the height and width dimensions of the display area of the user interface. The positions of each of the six hotspots in this two by three matrix may be variable and may be dependent upon which hotspots share claim to the same media items. For example, hotspots that do share claim to the same media items may be placed in positions that are adjacent to each other. In the example shown in FIG. 1, it may have been determined that no media items, or a relatively low number of media items, can be classified as both "Speech" and "Oldies", or as both "Speech" and "Rock". Similarly, it may have been determined that few or no media items can be classified as both "Classical" and "Oldies", or as both "Classical" and "Rock". Thus, at least in one embodiment, hotspots that share claim to the same media items are placed adjacent to each other (i.e., including horizontally adjacent, vertically adjacent, and diagonally adjacent) so as to avoid the shared media items from being interpreted as belonging to an intermediary hotspot that is disposed between the two sharing hot spots.

Although each of the hotspots in FIG. 1 is depicted as being of the same size, it is possible for the hotspots to be of different sizes. These different sizes may indicate the popularity of the hotspot and/or the number of the media items associated with the hotspot. Alternatively, these different sizes may indicate the total time length of the media items associated with the hotspot.

In one embodiment, color coding is used to visually separate different categories from each other. For example, the hotspots may be depicted in one of two primary colors arranged in a checkerboard pattern. As a specific example, in the illustration of FIG. 1, "Speech", "Hip-Hop" and "Oldies" may be in blue, and "Classical", "Pop" and "Rock" may be in yellow. Of course, it is also possible for more than two colors to be used, and it is further possible for each hotspot to be depicted in a separate, respective color.

The media map described hereinabove and illustrated in FIG. 1 displays a smooth and gradual transition between category hotspots, as indicated by the gradually changing shades of grey in FIG. 1. Instead of this gradual transition, the map can also incorporate an alternative approach that is based on using sub-criteria. This alternative approach may be preferable if non-overlapping sub-criteria need to be displayed, such as different artists, albums, radio stations, etc.

As described in International Patent Publication No. WO/2007/044389, different representations can be used for displaying sub-criteria, such as a disc or rectangular display of the media content. In addition, the usage of treemaps for the purpose of displaying the content of a music collection is described. In this approach, rectangles are recursively split three times: the whole library (the parent rectangle) is split into genres, each genre is split in its sub-genres, and finally each sub-genre is split in its artists. The size of the rectangles is equivalent to the amount of the sub-genres contributing to the whole music collection. The sub-genres, i.e., sub-categories, are not sorted in regards to the neighboring main categories.

Figure 2:
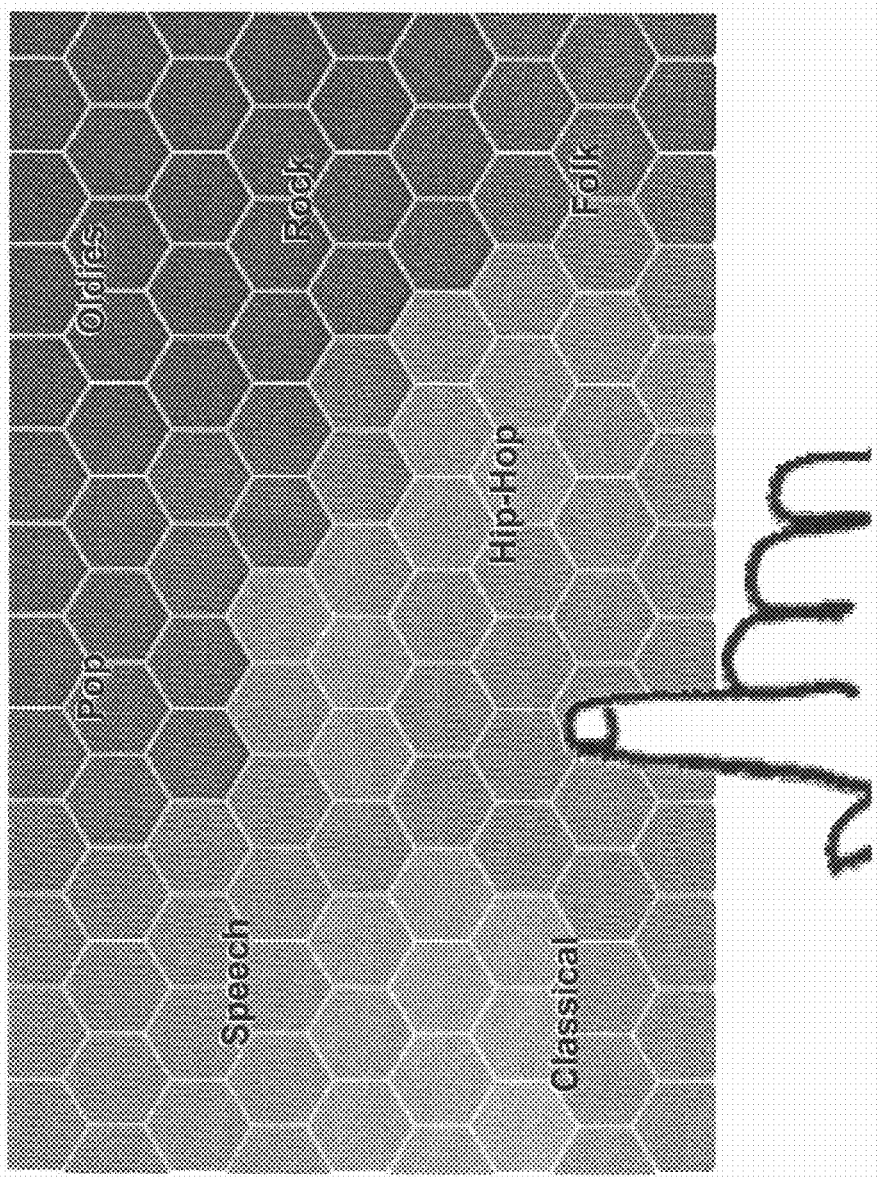
FIG. 2 is a diagram of one embodiment of a media map of the present invention that may be displayed on a display screen.

The irregular size of subdivided categories may increase the length of time required for a human to perceive the media map. In contrast, the system of the invention may use a different approach for displaying sub-categories in time-constrained environments such as in a vehicle. In one embodiment, an approach of the present invention is based on a regular sub-division of the media map illustrated in FIG. 1. This approach may be based on sampling the "smooth" transition between hotspots into a series of discrete cells, as shown in FIG. 2. Each of the resulting cells represents a sub-category of music. Each media item is assigned to one of the cells. As a result, media items are grouped into cells, and the position of the cell on the map indicates the relationships between the sub-category and all the main categories. In one embodiment, the sub-categories are displayed as rectangles or hexagons. For example, each hexagonal cell of the media map may represent a radio station, a CD, or a specific music sub-genre.

In embodiments described above, the media map is provided as a two-dimensional representation. However, in another embodiment, the media map is provided as a three-dimensional representation. The third dimension may be used to convey additional information about the sub-category, such as the playcount of available content in the sub-category, the amount of content within that sub-category that is available to the entertainment system, or the names of artists whose work is in that sub-category.

The media map may be the base for a range of interaction features offered to the user by the inventive entertainment system, including: direct playback by selecting; item list for selection; media preview by sliding; display user preferences in media map; exploring the media map; gesture interaction to define media sets of interest; gesture interaction to define playlists; combination of gestures; display additional information on media map; and provide overview of streaming media sources. Via the "direct playback by selecting" feature, by selecting a point on the media map (for example, by touching a point on a touch screen or by using another appropriate input device), the user may select a media item for playback or display. The media item chosen may match or be associated with the sub-category represented by the point or cell on the map. The inventive system may check all available sources for media items that fit the chosen sub-category, e.g., local and remote sources. Thus, the media map may accommodate combining content from different sources. If no media item is available for that point (e.g., no media item that is associated with the selected sub-category is available), then media items that are associated with the sub-category that is closest to the selected sub-category may be chosen. On the other hand, if more than one media item that is associated with the chosen point or cell on the media map is available, then the inventive system may use a "random" playback or a "recommended" playback incorporating user preferences (e.g., favorite music from certain artists or other criteria based on listening characteristics) to choose an item for playback among all matching media items.

A drawback of the direct playback scheme is that the user has no direct control over the media item chosen. Avoiding this disadvantage, the item list for selection feature of the invention provides a selection mode in which a list of alternative media items may be displayed in response to a user selecting a point or cell on the media map. Media items that belong to the selected point or cell on the map may be displayed in the list (or a variation of a list, such as a circular arrangement). Upon the user selecting one of the displayed items, the entertainment system may start playback of the selected item. Alternatively, a hierarchical list selection can be employed. For example, upon the user selecting an item in the first list, another list of items similar to the selected item may be presented. The criteria for including items on this second list may be more detailed than the criteria for including items on the first list.

The "media preview by sliding" feature may involve the user sliding his finger across the map. For example, the user may select a point on the map with his finger and then move his finger to another point on the map, all the while maintaining contact between the screen and his finger. Such an action may result in a media preview in which media samples corresponding to the current location of the finger are played or shown to the user. Similarly to the direct playback scheme, one of the matching media items associated with one of the touched points may be chosen by using "random" or "recommended" playback constrained to the items matching that point. If the user removes his finger from the screen, the selected media item may be entirely presented to the user, e.g., played back or displayed in full.

Instead of the media item itself, a symbolic representation, audio snippet or thumbnail can be displayed or played. Because audio files might not have significant content in the first seconds of, e.g., a song, the inventive system may search the whole audio file to find a more significant sample that better represents the file as a whole. This process of finding a representative audio snippet may use the same classification algorithm that is used for deciding where on the media map an audio file needs to be placed. The audio file may be broken down into short samples of approximately between two and five seconds, for example. Each sample may be classified with the algorithm, and the sample that most closely matches the sub-category of the audio file as a whole may be chosen to be the representative preview sample.

In the case of broadcast or streaming content, a similar approach can be chosen. For example, the most recent sixty seconds or so of the broadcast or streaming content may be cached and divided into snippets of two to five seconds. The snippet whose sub-category best matches the sub-category of the cached content as a whole may be played back to the user. Alternatively, the inventive system may present the "live" content of the chosen medium to the user.

According to the "display user preferences in media map" feature, hotspots and/or cells on the media map can grow and shrink in size. This makes it possible to encode additional information about the media collection in two dimensions. In one embodiment, the inventive system may provide increased area in the map for representing and selecting content from categories and/or sub-categories that are of greater interest to the user. Based on tracking of usage history, the two-dimensional hotspots and/or cells representative of categories and/or sub-categories that are frequently selected may change color and/or grow in area on the map over time. At the same time, other neighboring hot spots and/or cells that are selected less often may change color, move or shrink in size, and may even disappear entirely from the map. In addition, the hotspots and/or cells may grow or shrink in size according to the number or amount of media items available that correspond to each hotspot and/or cell. By combining both aspects (i.e., frequency of user selection and quantity of available content) in the map display, the inventive system may be able to quickly and compactly convey the information of what is of interest to the user and is available in sufficient numbers of media items to satisfy that interest.

Figure 4:
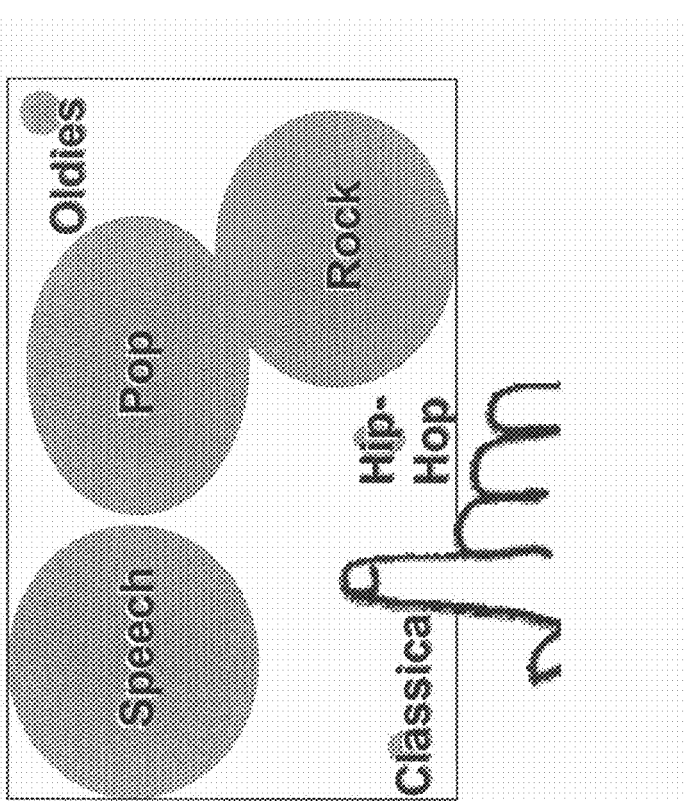
FIG. 4 is a diagram of yet another embodiment of a media map of the present invention that may be displayed on a display screen.
Figure 3:
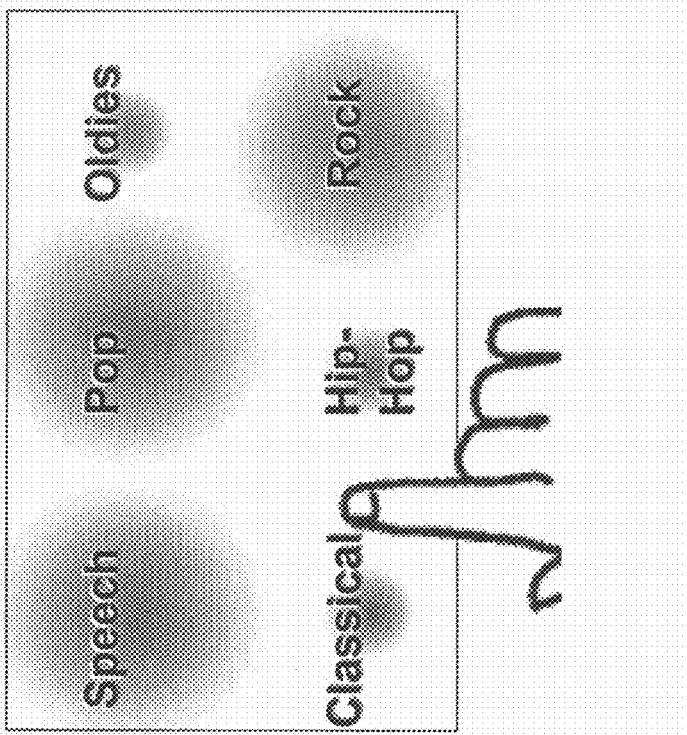
FIG. 3 is a diagram of another embodiment of a media map of the present invention that may be displayed on a display screen.

FIG. 3 illustrates grayscale hotspots provided with different sizes according to their popularity with the user as well as the quantity of available content in the corresponding audio category. FIG. 4 illustrates another embodiment in which black-and-white hotspots are provided with different sizes according to their popularity with the user as well as the quantity of available content in the corresponding audio category. Moreover, the locations of the hotspots in FIG. 4 may be adjusted such that each of the hotspots may fit within the confines or boundaries of the display screen.

Figure 5:
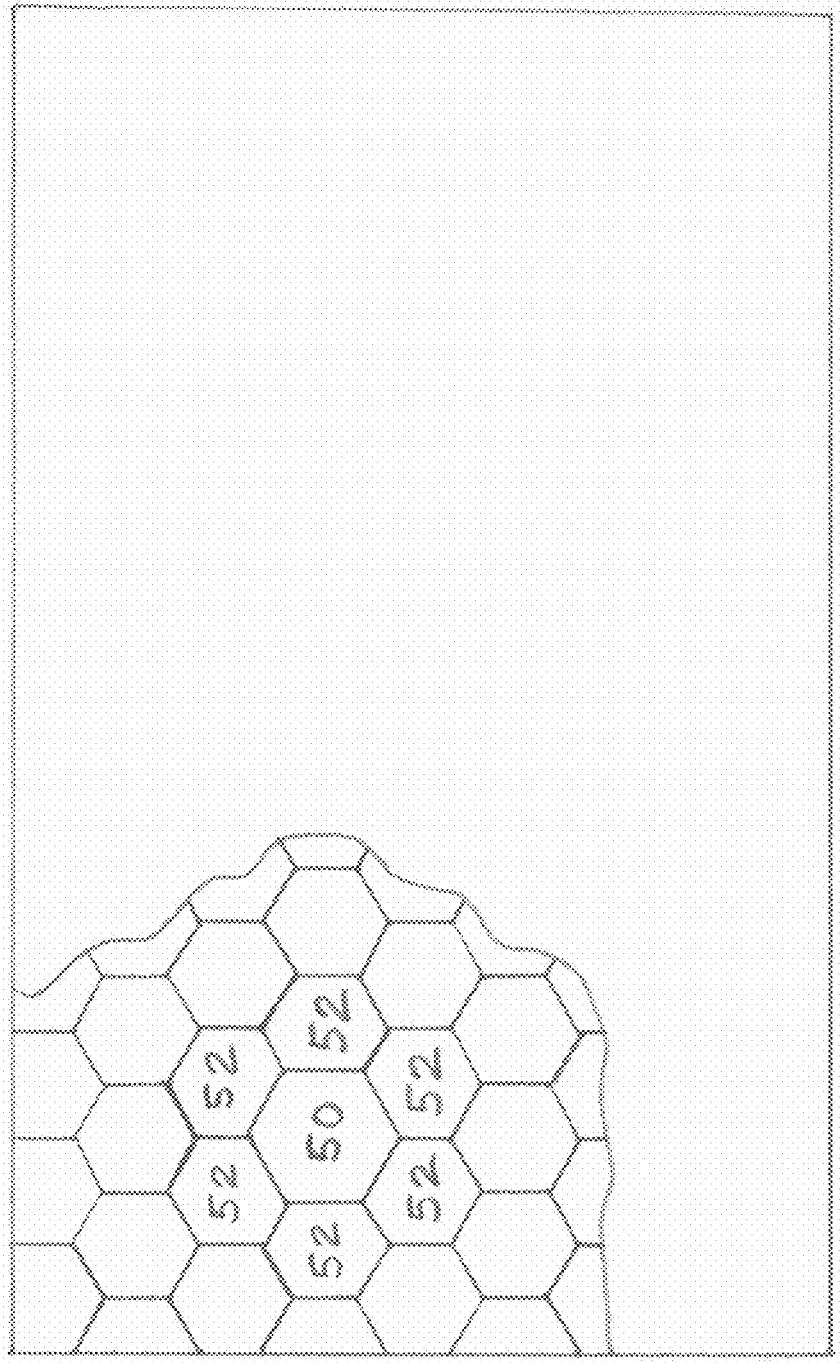
FIG. 5 is a fragmentary diagram of still another embodiment of a media map of the present invention that may be displayed on a display screen.

FIG. 5 illustrates another embodiment in which hexagonal cells are provided on a display screen to represent sub-categories of audio content. One cell 50 is larger than other cells in the display such that cell 50 is partially superimposed over, or overlaps, the surrounding cells 52. Similarly to the embodiments illustrated in FIGS. 3 and 4, cell 50 may be provided with increased size in order to indicate its relatively high level of popularity with the user and/or the relatively high amount of available content in the corresponding audio sub-category. As with the embodiments of FIGS. 3 and 4, in view of the higher likelihood that cell 50 will be selected by the user than any of the other cells, the increased size of cell 50 may have the advantage of making it easier for the user to place his finger on cell 50, and thereby select cell 50. Another advantage, mentioned above, is that the increased size of cell 50 visually brings to the user's attention that he has previously demonstrated a preference for cell 50 and/or that there is a relatively large supply of available content associated with cell 50.

The "exploring the media map" feature of the invention may enable the user to access information about a particular category or sub-category. Such information may not be otherwise displayed without positive action being taken by the user. This feature may be particularly applicable to large media collections about which the user might need more details in order to decide which category is of interest. The feature may include an exploration mode that enables zooming into the map in order to provide a greater level of detail about a particular area of the map. Zooming can be done with state of the art input technology, including multi-touch gestures to support input with more than one finger. Upon zooming, more detailed information about the sub-categories may be presented. Such detailed information may include the names of artists whose work is in the sub-category, or the number of media items available in the sub-category, for example. Also, if enough space is available, textual representations or names of the sub-categories may be displayed on the map. By using a continuous zoom, the user may be able to see the context of sub-categories in relation to main categories. In addition to zooming, a panning feature allows the user to explore the map at any given zoom level with his finger by moving the visible part of the map.

In another embodiment, a detailed view of selected sub-categories as well as an impression of the surrounding main categories may be provided by a "focus plus context" technique. An example of such a technique is the use of a fisheye zoom lens, which may enlarge a focus area in the middle of the field of view while reducing in size the peripheral areas which are outside of the focus area. Such a technique may provide a single view of the whole map, with a detailed rendering of the focus area. However, fewer details of the regions outside the focus area may be provided.

Figure 6:
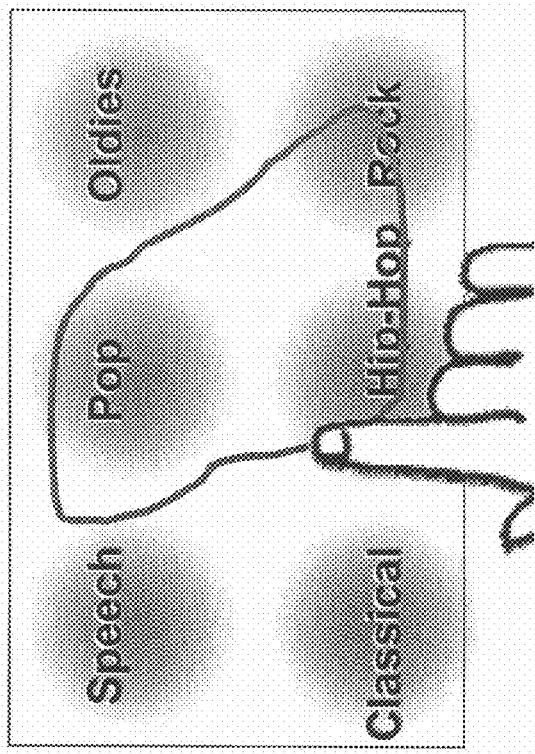
FIG. 6 is a diagram of a further embodiment of a media map of the present invention on which a closed shape has been drawn on a touch screen display.

The "gesture interaction to define media sets of interest" feature of the invention may provide an easy way of enabling the user to specify sets of media items of interest. By drawing a closed shape (e.g., a closed loop or any other closed path) on the map, the user can quickly convey to the system what content categories or sub-categories are currently of high interest to him. The closed shape may overlap multiple hotspots or cells, thereby directing the system to include all categories/sub-categories within the closed shape. In the example shown in FIG. 6, a closed shape has been drawn around the categories "Pop", "Hip-Hop" and "Rock". Using a traditional list-based content selection would require much more input from the user to express the same request.

The entertainment system may use the information (e.g., the closed shape) about the selected set of media items for playback or other purposes. In one embodiment, only items that are within the area covered by the closed shape are used or presented to the user. If more than one media item is among the selected set of media items (which is the typical case), the next active media item (e.g., the next media item to be played) may be determined by using either a constrained "random" playback or a "recommended" playback, as described hereinabove with regards to the direct playback feature.

In addition to a single stroke gesture to select an area of interest, in one embodiment the system enables the user to provide more complex definitions of areas of interest. For instance, several shapes can be drawn on the screen. The order in which the shapes were drawn may be taken into account by the system to define the order in which items are chosen for playback. In the example illustrated in FIG. 7, assume the user first drew a closed shape around "Speech" and then drew a closed shape around "Rock". In response to this sequence of drawings, the system may first tune into a radio station that is broadcasting speech, such as news or talk programming. After a predetermined length of time, which may be adjustable by the user, the system may then tune into another radio station that broadcasts rock music. Instead of staying tuned to the first station for a predetermined length of time, the system may switch stations when speech is no longer detected on the first station, or when a commercial break is sensed. In another embodiment, instead of automatically tuning to a talk station and then automatically tuning to a rock station, the system may present the user with multiple choices of talk stations, and then later may present the user with multiple choices of rock stations.

According to the "gesture interaction to define playlists" feature, the gesture input may be used for defining playlists as well as for defining sets of media items of interest. By drawing an open stroke on the screen, the user may define what items are to be put into the playlist and in which order. The sequence of the path through the music map may define the sequence of playback of media items from different categories. According to the example open stroke shown in FIG. 8, the playlist may first contain elements with speech content, and then, in order, elements with pop music, oldies music, rock music, and lastly hip-hop music. If more than one stroke is drawn, sequential playlists may be created that take into account the order in which the strokes were drawn. That is, media items corresponding to a first stroke in time may be played first, and media items corresponding to a second stroke in time may be played second.

Figure 8:
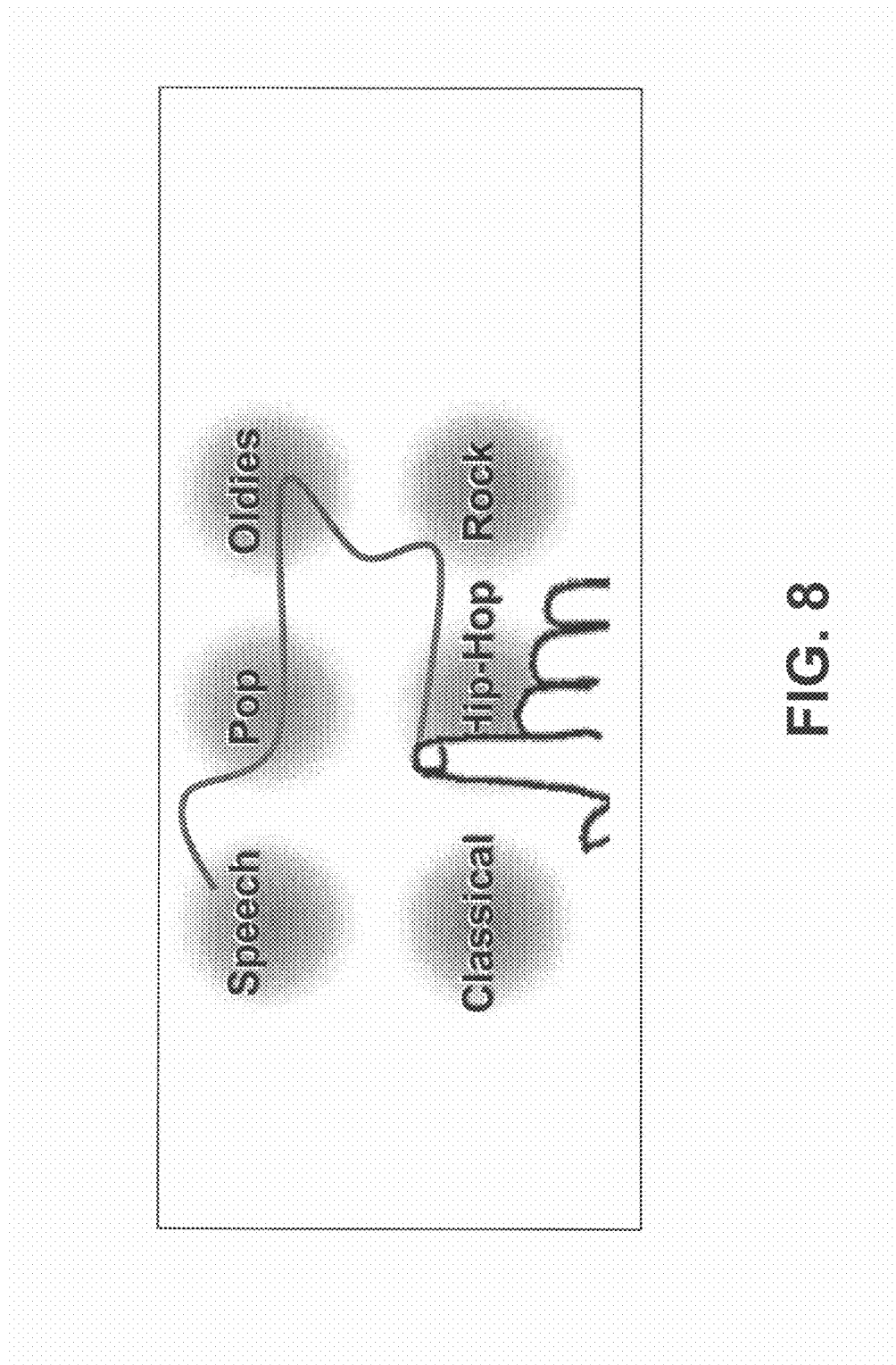
FIG. 8 is a diagram of yet another embodiment of a media map of the present invention on which an open stroke has been drawn on a touch screen display.

In one embodiment, an equal and/or predetermined length of time is spent playing each of these categories of media items. However, in another embodiment, the length of time spent playing each of the categories of media item is commensurate with the total path length through the hot spot. In the example of FIG. 8, the paths through the pop and oldies hotspots appear to be longer than the paths through speech and rock. That is, the path lengths through each of the pop and oldies hotspots are approximately equal to the widths of the hotspots, while the path lengths through each of the speech and rock hotspots are much less than the widths of the hotspots. Thus, more time may be spent playing pop music and oldies music than playing speech and rock music.

Figure 9:
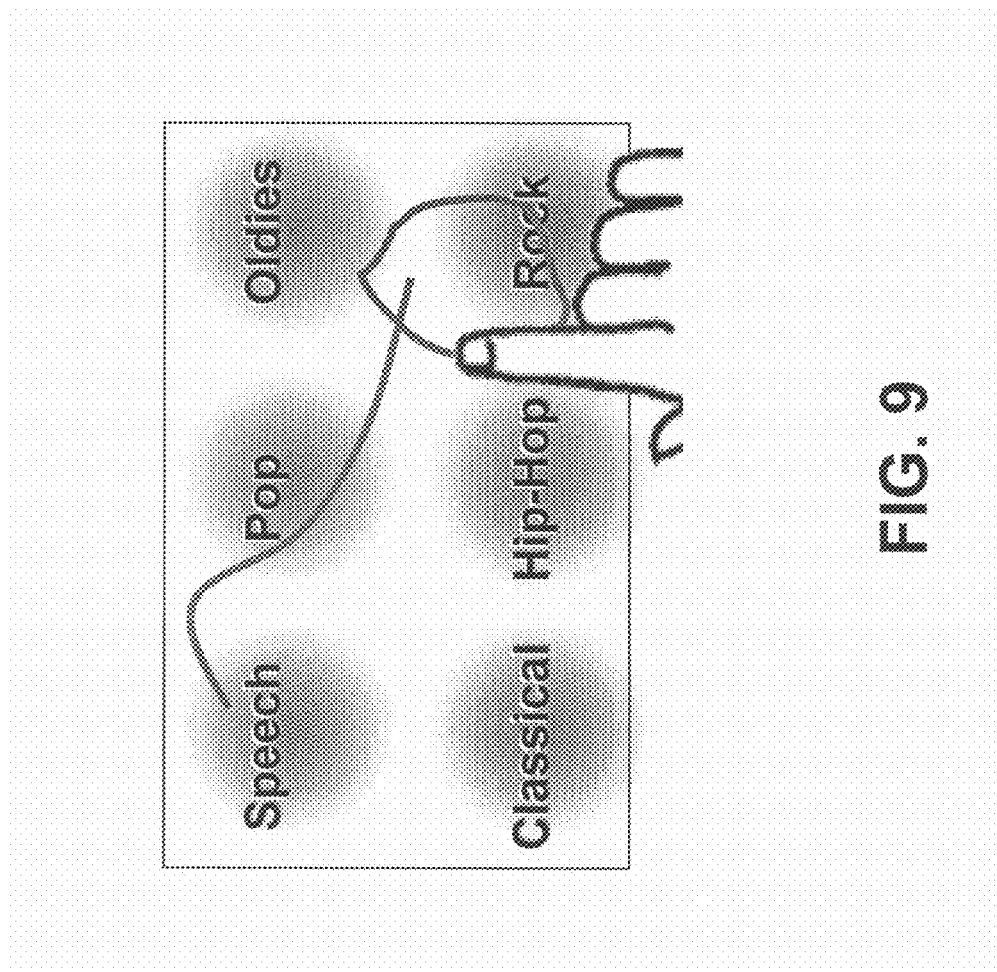
FIG. 9 is a diagram of still another embodiment of a media map of the present invention on which both an open stroke and a closed shape have been drawn on a touch screen display.

According to the "combination of gestures" feature, a combination of open and closed shapes can drawn on the touch screen display. Thus, the user may be able to easily express complex requests for media playback which define both playlists and sets of media items. In the example illustrated in FIG. 9, the user, by drawing the open ended curving line, has indicated his desire to first listen to some news (speech), then some pop music and then rock music. By then drawing the closed loop around "rock", the user has further indicated his desire that rock music be continued to be played for an indefinite time period after the news and pop music.

According to the "display additional information on media map" feature, in addition to the media map being used for input purposes, the media map may also used for communicating information back to the user. In one embodiment, the currently selected or currently playing media item may be highlighted on the map. For example, when music is playing, the system may highlight the genre of the music on the map by placing a marker on the map that represents the current genre.

Figure 10:
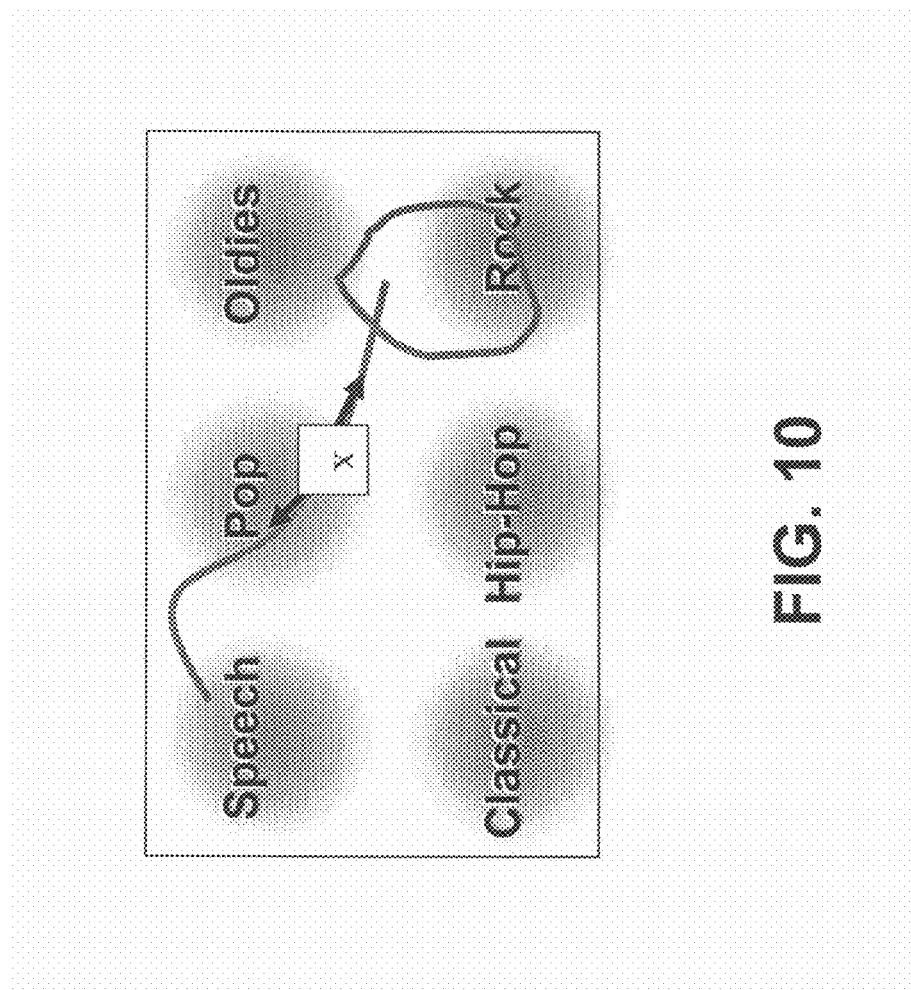
FIG. 10 is a diagram of the media map of FIG. 9 on which a marker of the currently playing media item has been added to the display.

If gestures were drawn by the user, the system may display the gesture and the category of the currently playing media item together on the map. Further, the current playlist may be displayed. In the example shown in FIG. 10, a square marker indicates the category of the currently playing media item. The "x" inside the square is included in FIG. 10 as an illustrative proxy for the current playlist, or additional textual information about the currently playing media item. Thus, the user may stay informed for example, about the progress through the playlist. In one embodiment, the marker on the playlist can be moved by the user along the gesture-defined path, as indicated by the two arrows in FIG. 10. Thus, the user may be able to repeat or skip ahead to another part of the playlist.

Figure 11:
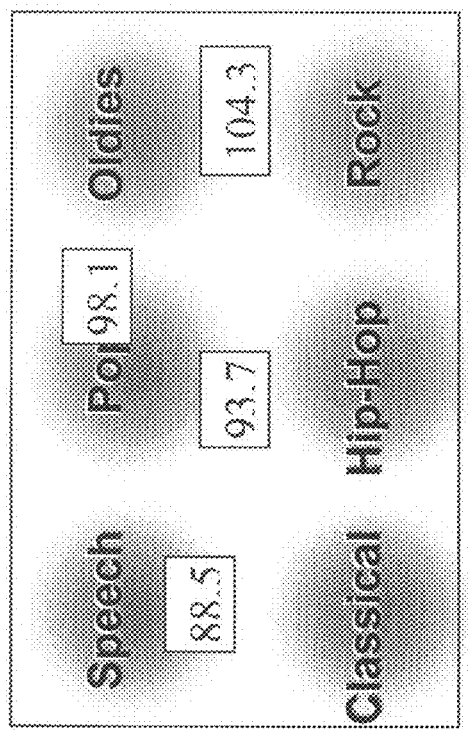
FIG. 11 is a diagram of still another embodiment of a media map of the present invention on which markers signify the categories of radio stations within reception range.

According to the "provide overview of streaming media sources" feature, the map may be used to inform the user about content that is available from different media sources, especially broadcast and streaming sources. For example, the map may show what category of content is currently playing on radio stations within reception range of the system. The category of each media source may be highlighted on the media map, and each marker may be labeled or named appropriately. For example, as shown in FIG. 11, the categories of the currently broadcasted content of four FM radio stations are indicated by four rectangular markers. Within each marker is the broadcast frequency of the respective radio station, expressed in MHz. By selecting a marker, such as by touching the marker, the user can choose to switch to the associated media source for playback. Alternatively, in association with each marker may be displayed a unique, respective descriptor that associates the source with a quick selection pushbutton. In the example illustrated in FIG. 12, the numbers 1-4 are displayed within the markers on the map to identify the number of the radio station preset pushbutton that is associated with each station. If one of the four radio stations is currently playing on the entertainment system, then its respective marker may so indicate, such as by being highlighted or lit up in a different color than the other three markers, for example.

The invention may be particularly applicable to an entertainment system in a vehicle, wherein a driver operating the system cannot devote too much attention to the task of selecting media items. With a known in-vehicle entertainment system including mp3 player, a user typically goes into the selection menus to find music that he likes. If the user has a large collection of music, finding the currently desired music may take a lot of time and attention. Even if the user knows what type of music he wants to listen to, he may have trouble conveying that information to the system. For example, assume a user wants to listen to something in-between pop and rock. However, the mp3 menu may allow him to choose only music that is either rock or pop. While thinking about these decisions, the user may be distracted from driving. Thus, a user often just uses the "random playback" and presses the skip key whenever he does not like the music. In contrast, an entertainment system of the present invention with a media map may show the music genres available in a user's music collection in a graphic representation. The genres may be "blended" into each other within the map. By clicking on the map, the user can select a particular kind of music and perhaps express his wishes to listen to music that is a mixture of different genres. Due to a music preview feature of the invention, the user may not even have to look at the screen while selecting the music. Instead, the user may slide his finger over the screen and the system may play music represented by whatever part of the media map that the user is currently touching. In response to the user sliding his finger to a different part of the screen, a different music genre from the user's collection may be played. The method of the invention may make it very easy for the user to choose music and it does not take a lot of his attention away from the driving task.

In another in-vehicle application, assume a user wants to hear some news and then switch to a mixture of classical and pop music. Known entertainment systems may require the user to switch through different radio stations. With the entertainment system of the invention, however, the user may switch to the media map which shows the different audio content such as news and music of different genres. Assume, for example, that the user draws three strokes on the map. The first stroke is a line drawn from the area labeled "speech" to the area labeled "classical". The second stroke is a circle around "classical", and the third stroke is a circle around "pop". The line instructs the system to create a playlist that transitions from "speech" to "classical" content. Further assume that the system has learned from previous active or passive feedback from the user that the user prefers news whenever he selects "speech" content. The inventive system may analyze all audio sources for news content and find a radio station that is currently broadcasting news. By drawing the two circles, the user has instructed the system to play content of the classical music and pop music types. Thus, with those three strokes, the user has given the system all needed information and can then focus on driving without the need to manually switch to different radio stations at different points in time.

The present invention may include several novel features, including an entertainment system (which may include a media player, car radio, etc.) that visually presents available media content on a map. The media content may include audio content, streaming media and/or broadcast media. The visual display may depend upon information that is either embedded in the media content (e.g., meta-data) or derived from the media content.

Another novel feature of the invention is that, in addition to displaying characteristics of individual media items such as songs, the invention may also display characteristics of sources or collections of media items on the map, such as radio stations, music albums and playlists. The sources or collections may be sampled, and their audio characteristics may be derived from the samples. Alternatively, information regarding the characteristics of the sources or collections may be embedded therein, such as meta-data.

Yet another novel feature of the invention may be that the media map enables a user to intuitively select media content (e.g., music, news, videos, radio stations, TV stations, and other broadcast and streaming content). No selection of media items from hierarchical lists may be required. Thus, a user does not have to make "hard" decisions for specific entries. Instead, the user may select points on the media map until he finds content he is interested in. Because no precise specification of the desired media item may be required, selection of content may be very fast and convenient. Media content may be chosen among all the available media sources, rather than just one, effectively combining all sources into one large source. Thus, the user may be relieved of the burden of determining which source includes the content he is seeking.

Still another novel feature of the invention may be that the map is based on a regular or consistent structure including different media categories, such as genre, being represented by hotspots. The categories may be blended into each other in-between the hotspots. The intermediate areas in-between the hotspots effectively represent media items that partially fit into one or more categories of nearby hotspots. This may benefits users who have difficulty choosing only a single category, such as a specific music genre.

Alternatively, or in addition, to hotspots, distinct areas ("cells") may be displayed on the screen using rectangular or non-rectangular shapes, which may be of the same size. Each cell may represent a respective sub-category. This approach may be preferable if the sub-categories are not overlapping (e.g., each sub-category represents different artists, albums, radio stations, etc.). The cells may be arranged such that related and similar sub-categories are grouped in close proximity to each other. In addition, the position of each cell in relation to the positions of the hotspots may depend upon the degree of similarity between the cell's sub-category and the categories represented by the hotspots.

Another novel feature of the invention is that in response to the user selecting a point on the map, media content that matches the category represented by that point may be played. If several media items match the category represented by that point, a media item may be chosen either by using a "random" function or by incorporating user preferences (e.g., favorite music from certain artists or other criteria based on the user's listening characteristics). Alternatively, all available matches may be presented to the user so he can choose one item himself. All available media sources or just a single media source may be looked through when searching for matching items. If no item matches the selected point on the map, then items that are similar (e.g., that are associated with points that are a short distance from the selected point on the map) may be played or offered to the user.

Yet another novel feature of the invention may be that the user sliding his finger on the screen may result in immediate feedback. For example, media samples corresponding to the point currently being touched on the map may be played or information about such media samples may be shown. If necessary, significant and/or representative parts within the audio or video content may be extracted to produce samples for the preview. The immediate feedback provided in response to sliding a finger across the screen may make it easy for the user to find content that he likes. In the case of audio content, the sliding of the finger across the screen and the selection of a media item can even be done without the user having to look at the screen. This may be especially beneficial in time-constrained environments, or in environments that demand the user's visual attention, such as when the user is driving a car.

Still another novel feature of the invention may be that hotspots for categories can grow in area on the display in response to the user selecting the hotspot frequently. Thus, such enlarged hotspots may represent categories that the user is specifically interested in and selects often. For examples, music genres that are listened to often may grow bigger over time on the map. Conversely, it is possible for a hotspot to shrink in size in response to being relatively infrequently selected by the user. Alternatively, or in addition, to the hotspot size being affected by the hotspot's popularity, hotspots may grow and shrink in correspondence to the amount or quantity of available media items associated with the hotspot.

A further novel feature of the invention may be that the media map can be explored by zooming and panning to provide more details for specific areas of the map. Other techniques such as the use of a fisheye zoom lens, or presenting a display with such a fisheye effect, may provide an increased level of detail for a focused area while still displaying the surrounding context of the focused area.

Still another novel feature of the invention may be the interaction of gestures with the media map to quickly and conveniently specify sets of media items of interest and playlists. By drawing shapes (one or several) on the screen, the user can specify media items he is interested in. Closed shapes may define sets of media, and open shapes may define playlists. Only items that are covered by, or within, the selected area may be used for playback, etc. Open and closed shapes can be combined. If more than one shape is drawn, the sequential order in the shapes are drawn may influence the items chosen by the system and/or the sequence in which the items are played back.

A further novel feature of the invention is that the currently playing media item may be highlighted on the media map. Also displayed on the media map may be the currently selected sets of media items of interest as defined by gestures and/or playlists. The relationship between the currently playing media item and the currently selected sets of media items of interest may also be displayed. A marker indicating the currently playing item can be moved on the screen by the user, such as by touching the marker and dragging it to another location on the screen. For example, the marker may be moved to another location along a path that specifies a current playlist. Thus, the user may cause the system to skip items in a playlist, re-play items in a playlist, and/or to progress or regress to a different part of the playlist.

Another novel feature of the invention is that content from all available streaming, broadcast, or "live" sources may be displayed on the map, such as content from radio and TV stations. Thus, the user may be provided with an overview of what is being currently broadcast, or what is available, from other sources. The user may be able to switch to other sources by selecting one of the displayed sources.

A still further novel feature of the invention is that the media map may also be provided in a three-dimensional version. The additional dimension may be used for displaying further information about the media items.

Figure 13:
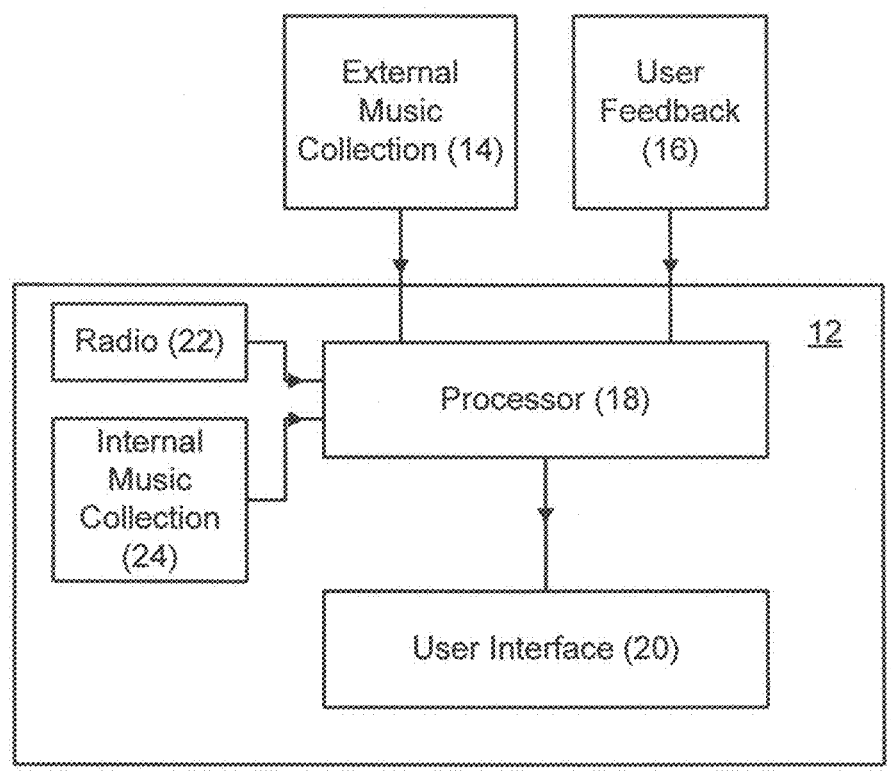
FIG. 13 is a block diagram of one embodiment of an entertainment system arrangement of the present invention.

FIG. 13 is a block diagram of one embodiment of an entertainment system arrangement 10 that may be suitable for use in conjunction with the present invention. Arrangement 10 may include an entertainment system 12 that may be communicatively coupled to a user's external music collection 14. Collection 14 may include digital reproductions of audible performances of songs or other pieces of music. System 12 may be at least partially or completely disposed within a vehicle, such as an automobile. However, system 12 may also be disposed in a non-mobile environment, such as a personal residence. System 12 may also actively or passively receive user feedback 16 regarding the user's musical likes and/or dislikes. In the particular illustrated embodiment, information about the contents of collection 14 as well as user feedback 16 are received by an electronic processor 18 of system 12.

Processor 18 may access and analyze the digital music that is included in collection 14 in order to determine what type(s) of music is in collection 14, or in what genre(s) the music falls into. Alternatively, collection 14 may include, in addition to reproductions of the music itself, identifying textual information or other representations about the artist(s) and/or type of music that is in collection 14. In one embodiment, processor 18 may access such identification information in order to determine the musical preference profile of the user without having to analyze the content of the music in collection 14.

User interface 20 may be similar to the user interface illustrated in FIG. 1, and may have a touch screen suitable for displaying any of the media maps in FIGS. 2-12. Processor 18 may graphically display on interface 20 representations of the media content available from collections 14, 24 and radio 22. Processor 18 may also modify the presentation on interface 20 based on user feedback 16 that is received. For example, processor 18 may cause certain cells to have an increased size, as shown in FIG. 5, in response to frequent selection by the user.

Sharing the music collection with the entertainment system can be performed according to various methods. A first of such methods may include inserting a CD/DVD with audio or video content into the entertainment system. A second method may include physically connecting a storage device to the entertainment system such as a USB stick, flash memory card, MP3 audio player or portable audio/video player. A third method may include connecting the entertainment system to a built-in storage device, such as a hard drive or flash memory, and thereby using the content of such built-in storage device. A fourth method may include using a short range data connection technology such as Bluetooth to connect the entertainment system with storage devices containing the user's preferred content. A fifth method may include using a wired or wireless data connection between the entertainment system and a remote music repository on the internet. This method may allow the user to include and analyze large music collections stored on internet servers without the need to put the music collections on a local physical storage device.

By accessing the remote audio/video collection, the collection's content may be analyzed and the type of music present in the collection may be determined. The entertainment system may use the same music collection later on for playback purposes.

Figure 14:
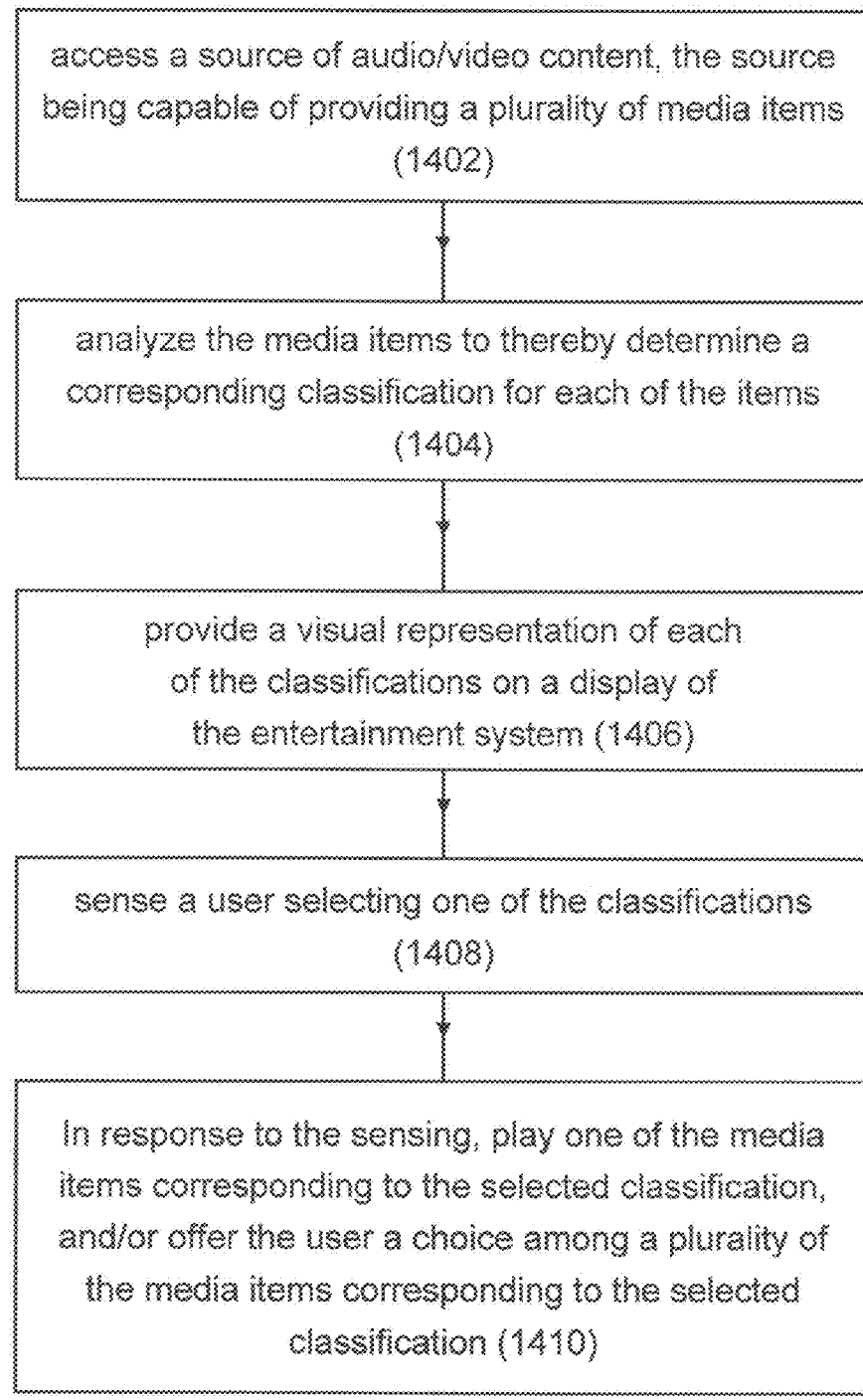
FIG. 14 is a flow chart of one embodiment of a method of the present invention for operating an entertainment system.

In FIG. 14, there is shown one embodiment of a method 1400 of the present invention for operating an entertainment system. In a first step 1402, a source of audio/video content is accessed, the source being capable of providing a plurality of media items. For example, a vehicle audio system may be communicatively coupled (wired or wirelessly) to a passenger's iPod or other personal music player that the user carries into the passenger compartment of the vehicle with him. The audio system may be able to retrieve the media items (e.g., songs) on the player and/or identifications of the songs that the player is capable of providing.

In a next step 1404, the media items are analyzed to thereby determine a corresponding classification for each of the items. That is, the songs in the collection may be analyzed by any of various methods, including sampling and quantitative analysis, to determine a corresponding type or genre of music under which each of the songs may be classified. Alternatively, or in addition, the artist or artists who performed each of the songs in the collection may be determined. The type(s) or genre(s) of music that is/are typically produced by the artist(s) may be ascertained, such as by use of a lookup table, for example.

Next, in step 1406, a visual representation of each of the classifications is provided on a display of the entertainment system. For example, as shown in FIG. 2, a visual representation of each sub-category of available audio items may be presented on a display of an entertainment system in the form of a respective hexagon.

In step 1408, a user selecting one of the classifications is sensed. That is, in the case of a touch-sensitive screen, a user touching one of the cells shown in FIG. 2 may be sensed. It is also possible within the scope of the invention to sense a user speaking one of the classifications, such as "pop" or "rock", etc., or a combination of classifications, such as "pop-rock", or "oldies-rock", for example.

In a final step 1410, in response to the sensing, one of the media items corresponding to the selected classification is played, and/or the user is offered a choice among a plurality of the media items corresponding to the selected classification. For example, an available song that qualifies for the sub-category selected by the user may be played. If more than one available song meets the criteria of the selected sub-category, then it is possible to present to the user a list of the qualifying songs and let the user choose for himself which of the songs from the list should be played.

Figure 15:
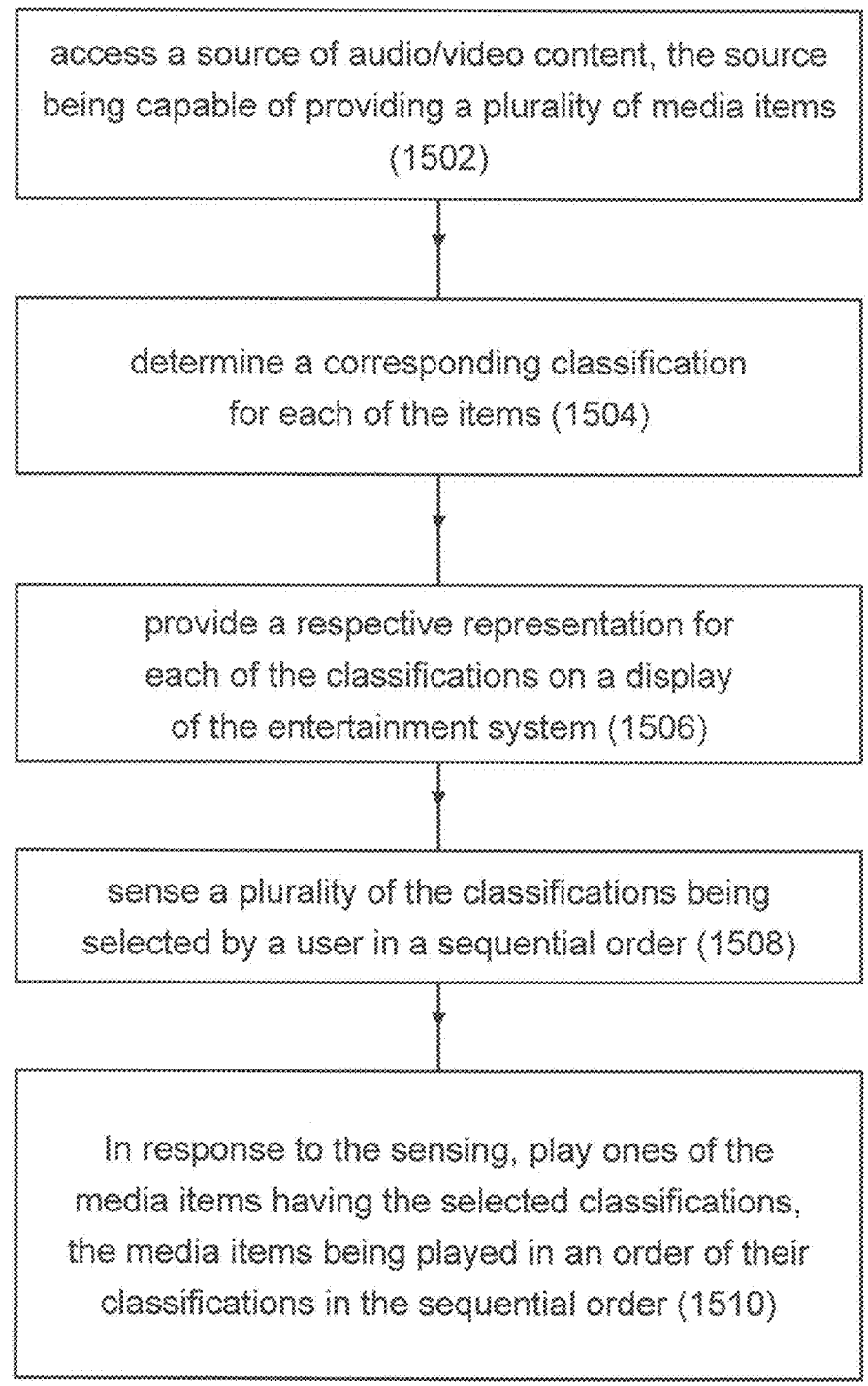
FIG. 15 is a flow chart of another embodiment of a method of the present invention for operating an entertainment system.

Another embodiment of a method 1500 of the present invention for operating an entertainment system is illustrated in FIG. 15. In a first step 1502, a source of audio/video content is accessed, the source being capable of providing a plurality of media items. For example, a vehicle audio system may include a radio that is capable of receiving and playing broadcasts from a number of local radio stations. The vehicle may be in the form of an automobile, airplane, bus, train or ship, for example.

In a next step 1504, a corresponding classification for each of the items is determined. For example, a respective category or sub-category of music genre may be determined for a number of received radio stations by sampling and analyzing the stations' signals. Alternatively, a radio station's classification information may be embedded in its broadcast signal or may be derived from classification information embedded in each of the songs that the station broadcasts.

Figure 12:
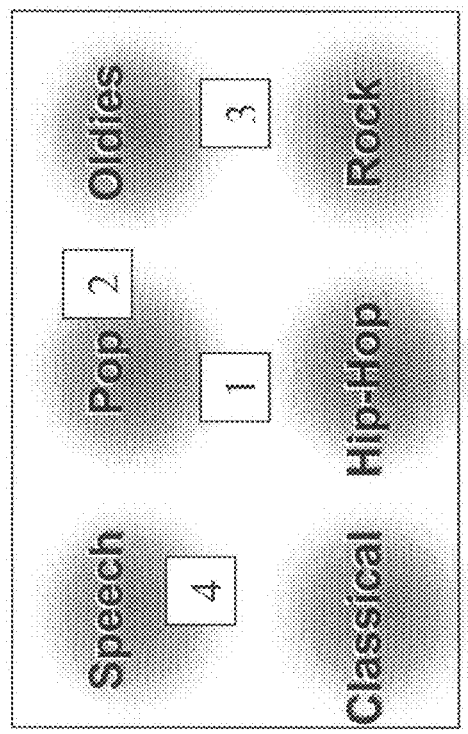
FIG. 12 is a diagram of a further embodiment of a media map of the present invention on which markers signify the categories of radio stations within reception range.

Next, in step 1506, a respective representation for each of the classifications is provided on a display of the entertainment system. Continuing the example above, as shown in FIGS. 11 and 12, four markers may each represent, by virtue of the marker's location on the display, the category and/or sub-category of a respective radio station. The hotspots of "speech", "pop", "oldies", "rock", "hip-hop", and "classical" may also be representations of classifications. For example, the hotspot "speech", or more specifically a cell along the lower boundary of the "speech" hotspot, may represent a classification of the radio station broadcasting at 88.5 MHz.

Figure 7:
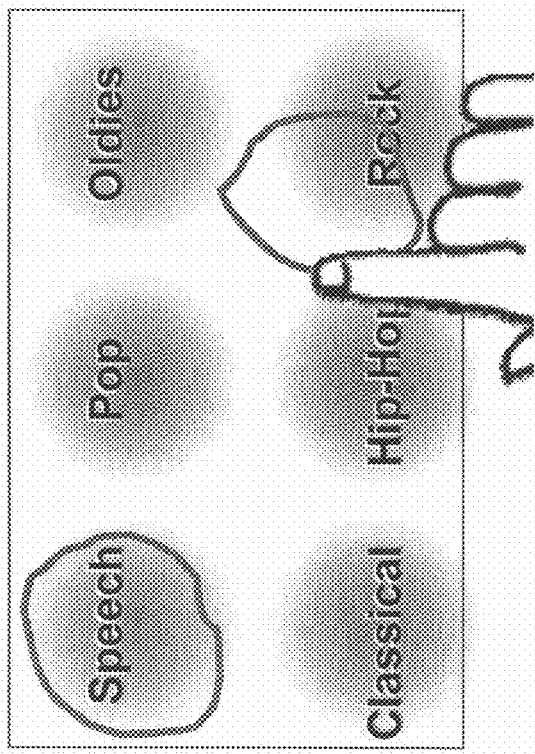
FIG. 7 is a diagram of another embodiment of a media map of the present invention on which two closed shapes have been drawn on a touch screen display.

In step 1508, a plurality of the classifications being selected by a user in a sequential order may be sensed. For example, as shown in FIG. 7, the system may sense that a user has first selected "speech" by drawing a closed shape around it, and has thereafter selected "rock" by drawing a second closed shape around it. Another example is shown in FIG. 8 wherein a user has slid his finger around the display to thereby select "speech", "pop", "oldies", "rock", and "hip-hop" in sequence, and this sequential order is sensed by the system.

In a final step 1510, in response to the sensing, ones of the media items having the selected classifications are played, the media items being played in an order of their classifications in the sequential order. For example, in the example of FIG. 7, the system first tunes into a radio station broadcasting news or other talk. Subsequently, the system tunes into a radio station that generally, or at least currently, broadcasts rock music. In the example of FIG. 8, the system may sequentially tune in radio stations that generally, or at least currently, broadcast human speech, pop music, oldies music, rock music, and hip-hop music.

Figure 16:
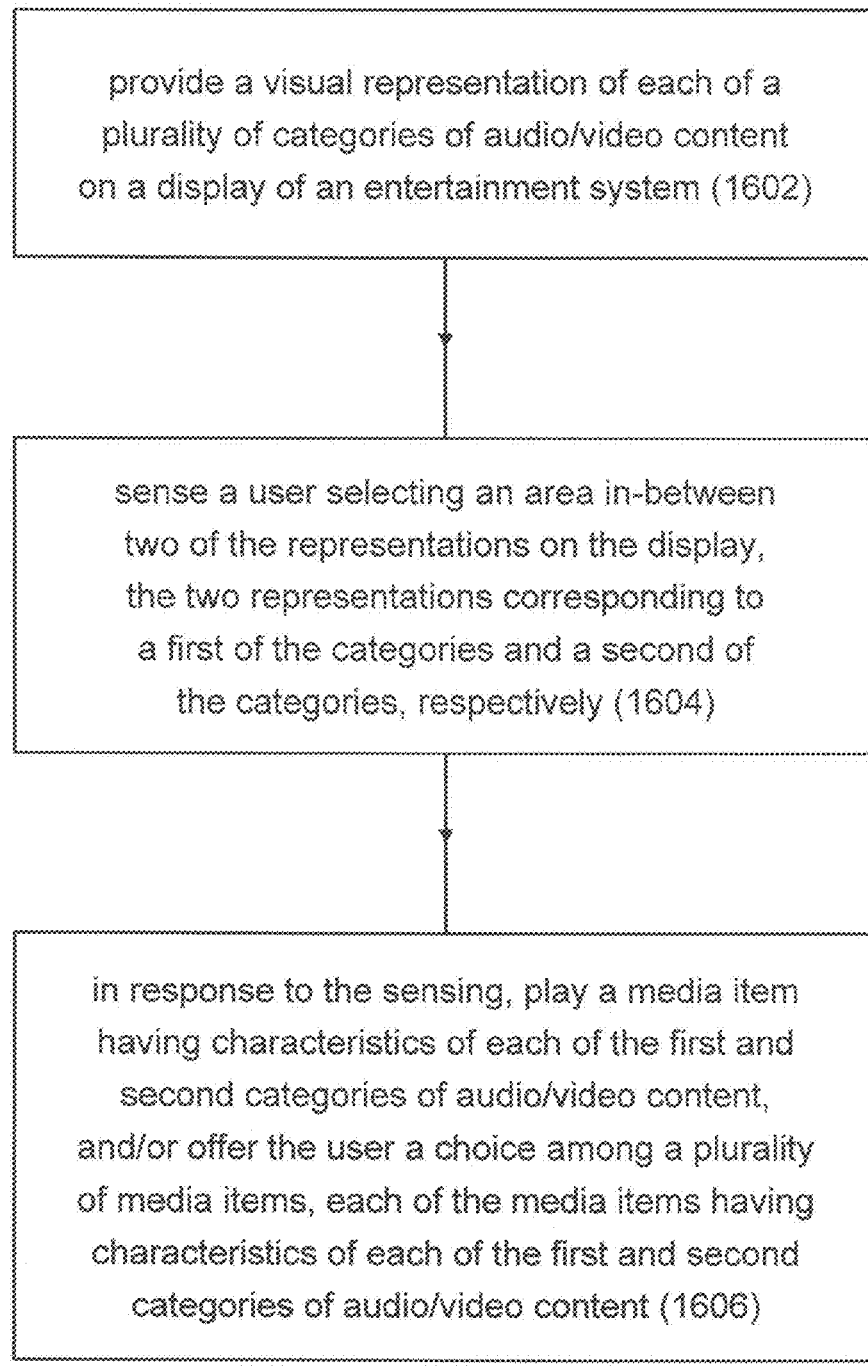
FIG. 16 is a flow chart of yet another embodiment of a method of the present invention for operating an entertainment system.

Yet another embodiment of a method 1600 of the present invention for operating an entertainment system is illustrated in FIG. 16. In a first step 1602, a visual representation of each of a plurality of categories of audio/video content is provided on a display of an entertainment system. For example, as shown in many of the drawings, the hotspots of "speech", "pop", "oldies", "rock", "hip-hop", and "classical" may be representations of categories of audio content.

In a next step 1604, it is sensed when a user selects an area in-between two of the representations on the display, the two representations corresponding to a first of the categories and a second of the categories, respectively. For example, as shown in FIG. 2, a user's index finger may be on a cell that is disposed in-between the hotspots of classical music and hip-hop music.

In a final step 1606, in response to the sensing, a media item having characteristics of each of the first and second categories of audio/video content is played, and/or the user is offered a choice among a plurality of media items, each of the media items having characteristics of each of the first and second categories of audio/video content. Continuing the example above wherein the user selects a cell between classical music and hip-hop music, the system may, in response, play an available song that has characteristics of both classical music and hip-hop music. For example, the system may find a song that has a beat or rhythm characterizing hip-hop music as well as string instruments that characterize classical music. If the system can find more than one such song, then the system may present a list of such songs to the user so the user can choose for himself which of the songs to play.

Various methods may be employed within the scope of the invention for identifying, classifying, and/or quantifying the types of music that describe and/or define a user's musical taste. Radio signals in the Radio Data System (RDS) standard (Europe) or in the Radio Broadcast Data System (RBDS) standard (U.S.) may specify the type of music that the station broadcasts, such as classical, pop, jazz, etc. Music collections analyzed by the system of the invention may include similar descriptions of the classification(s) of music contained in the collections. It is also possible to classify music by artist or by groups of artists. For example, if a collection includes a piece by a certain artist, it may be deemed likely that the user would also enjoy other pieces by that artist. Moreover, an artist may be identified as producing pieces of a particular musical genre. For example, music produced by symphony orchestras may be assumed to be classical. Thus, a user whose taste includes primarily classical music may be assumed to also enjoy music by other classical artists, such as music by other symphony orchestras. It is also possible for the system to analyze the music itself in order to classify the music. For example, recurrence quantification analysis may be applied to the music in order to identify its musical genre.

The invention has been described herein as pertaining primarily to identifying audio preferences of listeners and tailoring audio offerings to those preferences. However, the present invention may be equally applicable to identifying video preferences of listeners and tailoring video offerings to those preferences.

The invention has been described herein as pertaining primarily to identifying musical preferences of listeners and tailoring musical offerings to those preferences. However, the present invention may be equally applicable to identifying other types of listeners' preferred audio genres (e.g., audiobooks) and audio artists (e.g., literary authors such as Ken Follett). The invention has been described herein as pertaining primarily to in-vehicle entertainment systems. However, the present invention may be equally applicable to stationary and portable radios and portable music players.

While this invention has been described as having an exemplary design, the present invention may be further modified within the spirit and scope of this disclosure. This application is therefore intended to cover any variations, uses, or adaptations of the invention using its general principles.

What is claimed is:

1. A method of operating an entertainment system, said method comprising the computer-implemented steps of:

accessing a source of audio/video content, the source being capable of providing a plurality of media items;

determining a corresponding classification for each of the items;

providing a respective cell representation for each of the classifications on a display of the entertainment system;

sensing a plurality of the cells being selected by a user in a sequential order;

in response to the sensing, playing ones of the media items having classifications corresponding to the selected cells, the media items being played in an order of their cells in the sequential order;

detecting how frequently each of the cells are selected; and in response to the detecting, providing each of the cells with a respective size corresponding to how frequently the cell is selected, wherein the source of audio/video content comprises a radio, the media items including a plurality of radio stations within reception range of the radio, comprising the further step of enabling the user to set a time period that each of the media items are played before automatically switching to playing a next one of the media in the sequential order.

* * * * *